AUTOMATIC GAIN CONTROL CIRCUIT UTILIZING VARIABLE CAPACITANCE

Filed June 25, 1958

INVENTOR.
GLENN C. BACON
BY
Walter J. Madden, Jr.
ATTORNEY

United States Patent Office 2,982,822

Patented May 2, 1961

2,982,822

AUTOMATIC GAIN CONTROL CIRCUIT UTILIZING VARIABLE CAPACITANCE

Glenn C. Bacon, San Jose, Calif., assignor to International Business Machines Corporation, New York, N.Y., a corporation of New York Filed June 25, 1958, Ser. No. 744,532

1 Claim. (Cl. 179—100.2)

Figure 1:
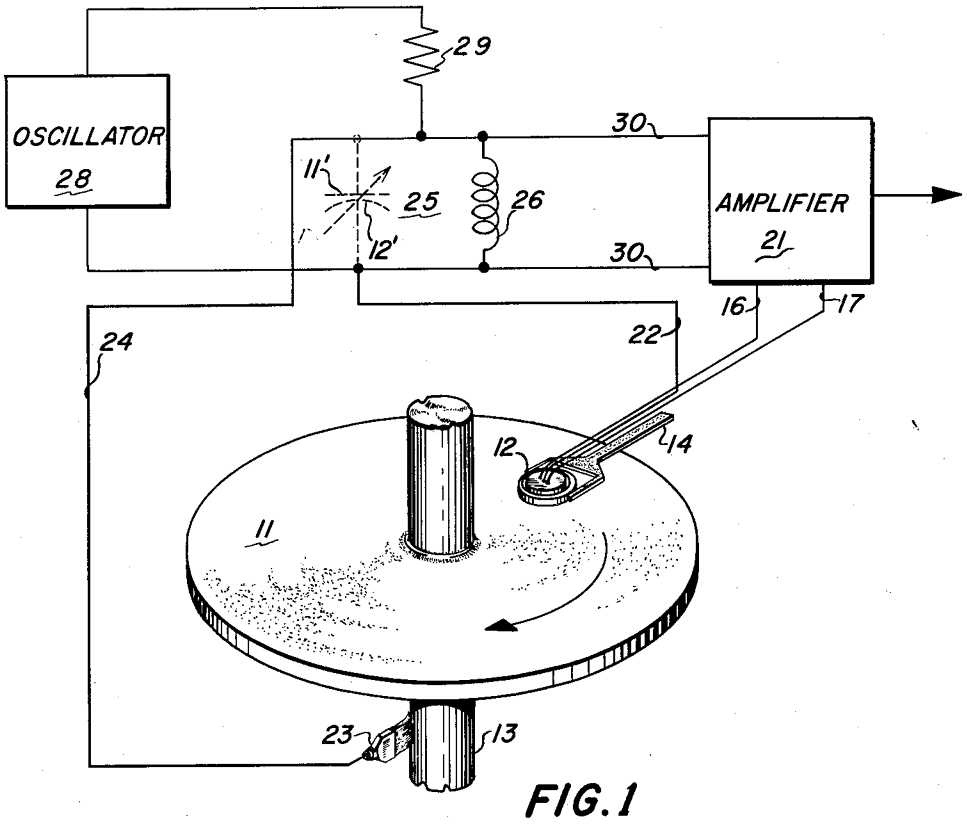

This invention relates, in general, to automatic gain control circuits and relates more particularly to such automatic gain control circuits responsive to the spacing between a recording surface and a transducer cooperating therewith.

There are numerous applications where it is desirable to control the gain of an amplifier circuit associated with a transducer which is magnetically cooperating with and spaced from a movable recording surface. One of such applications arises in connection with a magnetic storage device in which the recording surface is in the form of a rotating disc having magnetic material distributed on the surface thereof. In such a device one or more transducer heads are positionable relative to the recording surface for recording on and reproducing data from the recording surface. In this application it is desirable that the spacing between the transducer and the recording surface remain constant during rotation of the discs. However, even with the most careful manufacturing techniques, there is always some variation from a true plane in the surface of the disc, so that the spacing between the transducer and the disc varies during the rotation of the disc. Such variation in spacing is undesirable since it produces variations in the output signal of the transducer. For example, the output voltage amplitude from the transducer usually varies almost directly with the spacing between the transducer and the disc. Similarly, in recording on the disc, variations in spacing between the transducer and the disc surface result in variations of the intensity of the magnetization produced on the disc. These amplitude variations are particularly objectionable where the equipment is used in association with some type of digital computer or other apparatus, since in these applications the equipment is designed to handle pulses of substantially constant amplitude and the appearance of pulses of other than substantially constant amplitude is both unnecessary and undesirable.

Broadly, the present invention contemplates an automatic gain control circuit for a system having a transducer which cooperates with a movable recording surface, in which variations in the spacing between the transducer and the recording surface are utilized to control the gain of the amplifier associated with the transducer. In the preferred form of the invention, variations in the spacing between the transducer and the recording surface are converted into variations in the capacitance by treating the transducer and the recording surface as opposite plates of a capacitor separated by an air dielectric having a thickness corresponding to the spacing between the transducer and the recording surface. Thus, variations in the spacing between the transducer and the record surface produce corresponding variations in the effective capacitance between the transducer and the record surface, and these variations in capacitance are utilized to control the gain of the amplifier associated with the transducer. In one form of the invention, the variable capacitor formed by the transducer and the record surface is included in one arm of a parallel resonant circuit across which is applied a signal having a substantially constant frequency. Variations in the spacing between the transducer and the record surface produce corresponding variations in the capacitance to shift the resonant frequency of the circuit. This change in resonant frequency produces a change in the voltage across the resonant circuit which is utilized to vary the gain of the amplifier in a direction tending to return the amplifier output signal amplitude to the desired value.

It is therefore an object of the present invention to provide an improved automatic gain control circuit for an amplifier.

It is a further object of the present invention to provide an automatic gain control circuit for an amplifier associated with a transducer which cooperates with a record surface spaced therefrom, in which variations in the spacing between the transducer and the record surface are utilized to control the gain of the amplifier.

It is an additional object of the present invention to provide an automatic gain control circuit for an amplifier associated with a transducer which cooperates with a record surface which is spaced therefrom, in which the variable spacing between the transducer and the record surface is utilized as a variable capacitor to control the gain of the amplifier.

It is a further object of the present invention to provide an automatic gain control circuit for an amplifier associated with a transducer which cooperates with a record surface spaced therefrom, in which variations in the spacing between the transducer and the record surface are converted into variations in the capacitance in a resonant circuit, and variations in the output of the resonant circuit are utilized to control the gain of the amplifier.

Figure 2:
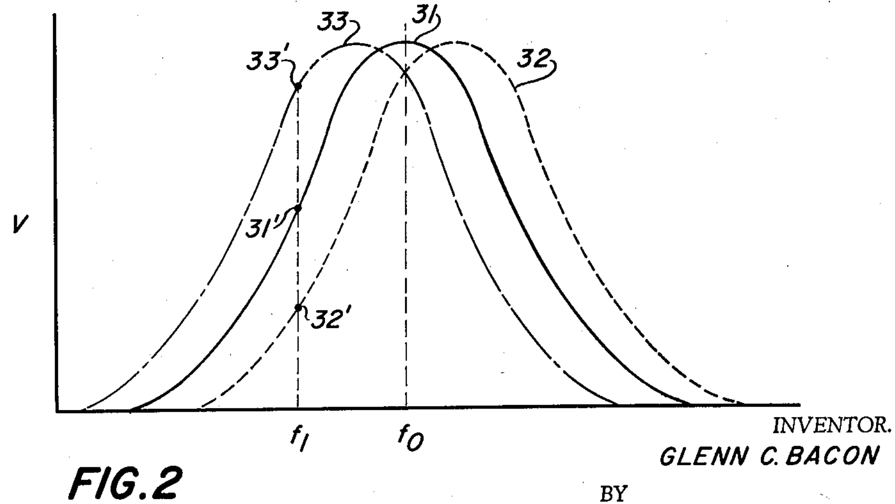

Objects and advantages other than those set forth above will be apparent from the following description when read in connection with the accompanying drawing, in which:

Fig. 1 diagrammatically illustrates one embodiment of the present invention utilized in connection with a rotating disc data storage device having a spaced transducer associated therewith; and Fig. 2 is a series of curves illustrating the operation of effects on the resonant circuit of variations in the capacitance between the transducer and the record surface.

Referring to Fig. 1, the invention is illustrated in connection with a magnetic data storage device including a disc 11 which is rotated by a shaft 13. Disc 11 is provided on the surface thereof with a suitable magnetic material, such as any one of the magnetic oxides commonly used. A transducer 12 is spaced from disc 11 and cooperates therewith in reproducing data therefrom. Transducer 12 may be of any suitable type which is adapted to reproduce data which has been recorded on the surface of disc 11. If desired, transducer 12 may be so designed and connected that it may be utilized for both recording on and reproduction from disc 11. Transducer 12 may be fixed with respect to disc 11, or alternatively, the transducer may be positionable to any one of a number of selected positions radially of disc 11 to cooperate with different tracks or channels on the disc. As shown in the drawing, disc 11 may be mounted on a supporting arm 14 which is provided with some type of gimbal mounting for aiding in producing alignment of the transducer relative to the surface of disc 11. Transducer 12 may be provided with a winding which produces an output signal across a pair of conductors 16 and 17. This output signal is supplied to an amplifier 21 where it is amplified and then supplied to some type of utilization apparatus.

Transducer 12 is also provided with a conductor 22 which is connected to the frame or other portion of the transducer so as to form one plate of a capacitor. The other plate of the capacitor is formed by the surface of disc 11, and this other plate may be connected in the circuit by any suitable means, such as a brush 23 which rides on shaft 13 and is thus effectively connected to the surface of disc 11. Brush 23 has attached thereto a conductor 24 which, together with conductor 22, leads to a parallel resonant circuit 25. Resonant circuit 25 has a capacitive branch which includes the capacitance between transducer 12 and the surface of disc 11, as represented by the dotted capacitor plates 11' and 12'. The inductive branch of the resonant circuit may include an inductive coil 26 connected in parallel with the capacitor represented by transducer 12 and the disc 11. In practice, it may be desirable to add some amount of fixed capacitance in parallel with the variable capacitance between transducer 12 and the disc 11 in order to reduce the effect on the resonant circuit of changes in the value of the variable capacitance. The resonant circuit 25 is supplied with an input of substantially constant frequency by an oscillator 28 through a voltage dividing resistor 29. The voltage appearing across the resonant circuit is impressed on amplifier 21 through conductors 30 so as to vary the gain of the amplifier 21 in response to variations in the voltage across the resonant circuit.

The operation of the automatic gain control circuit of the present invention may be more clearly understood by reference to Fig. 2, which is a series of curves illustrating the operation of the resonant circuit for varying spacings between transducer 12 and the surface of disc 11. The solid curve 31 of Fig. 2 illustrates the resonant characteristics of the resonant circuit 25 when transducer 12 has a mean spacing from disc 11. Under these circumstances, resonant circuit 25 has a resonant frequency represented by the frequency $f_0$. The frequency of oscillator 28 is chosen with respect to the resonant frequency of circuit 25 so that the circuit operates on one or the other portions of relatively linear slope of the resonant curve. For example, oscillator 28 may operate at a frequency represented by $f_1$, resulting in operation of the resonant circuit 25 at point 31' on curve 31. Under these conditions, the voltage across resonant circuit 25 is represented by the level of point 31', and a measure of this voltage is impressed on the amplifier 21 as an automatic gain control signal. The magnitude of the automatic gain control signal from circuit 25 when transducer 12 has the desired spacing from disc 11 is such that it maintains the gain of amplifier 21 at some mean value.

The voltage variations across resonant circuit 25 may be utilized as an automatic gain control signal in any suitable manner. For example, the voltage across resonant circuit 25 can be rectified and supplied through a coupling capacitor to the grid of a remote cutoff pentode which serves as the amplifier for the output signal from transducer 12. Under these circumstances, variations in the automatic gain control signal from resonant circuit 25 are supplied to the grid of the remote cutoff pentode to shift the bias or operating level of the tube in accordance with the variations in the spacing between the transducer and the record surface. Alternatively, any other suitable means for coupling the automatic gain control signal to the amplifier 21 may be employed.

If the spacing between transducer 12 and the surface of disc 11 then changes, the capacitance between transducer 12 and the surface of the disc also varies. This varies the characteristics of the resonant circuit 25 to produce a resonant characteristic corresponding to, say, curve 32. For curve 32 the fixed frequency $f_1$ of oscillator 28 results in a voltage across the resonant circuit corresponding to the level of point 32', thus representing a decrease in the voltage across the resonant circuit from the former voltage level represented by point 31'.

This voltage decrease is supplied to the amplifier 21 as an automatic gain control signal for varying the gain of amplifier 21 in a direction tending to return the amplifier output signal level to the desired value.

Similarly, if the spacing between transducer 12 and the surface of disc 11 varies in the opposite direction from the mean spacing, the shape of the resonant characteristic for circuit 25 shifts to one represented by, say, curve 33. For curve 33 the fixed frequency $f_1$ of oscillator 28 results in a voltage across the resonant circuit corresponding to the level represented by point 33' on curve 33, to produce an output signal which is impressed on amplifier 21 and which varies the gain of amplifier 21 in the direction to return the amplifier output signal level to the desired value.

Thus, it will be seen that I have provided a novel automatic gain control circuit which is responsive to variations in the spacing between a transducer and a recording surface associated therewith. Although the invention has been illustrated in connection with the reproduction of data from a storage device, it will be apparent that it is equally applicable to control the gain of an amplifier in response to variations in the spacing between a transducer and a recording surface during the recording of data on the surface. Under these conditions, amplifier 21 would be utilized to amplify the signals to be recorded prior to supplying them to the transducer, and the gain of amplifier 21 would be controlled in response to variations in the spacing between the transducer and the recording surface, substantially as described above.

While there have been shown and described and pointed out the fundamental novel features of the invention as applied to the preferred embodiment, it will be understood that various omissions and substitutions and changes in the form and details of the device illustrated and in its operation may be made by those skilled in the art, without department from the spirit of the invention. It is the intention, therefore, to be limited only as indicated by the scope of the following claims.

What is claimed is:

In combination, a transducer, a magnetic recording surface spaced from said transducer and movable relative thereto, the spacing between said transducer and said surface being subject to variations in both directions from a desired value during said relative movement, said transducer cooperating magnetically with said recording surface, electrical amplifying means connected to said transducer, a resonant circuit having an inductive branch and a capacitive branch, said capacitive branch including the capacitance between said transducer and said recording surface, means for supplying to said resonant circuit an input signal of substantially constant frequency to cause said resonant circuit to operate at approximately the midpoint of one slope of its resonant characteristic curve when said spacing has said desired value, variations in said spacing from said desired value producing variations in either direction in the operating point on said characteristic curve from said midpoint, and means for supplying a measure of the voltage across said resonant circuit to said amplifying means to vary the gain of said amplifying means in either direction in response to variations in said spacing from said desired value.

References Cited in the file of this patent

UNITED STATES PATENTS

| | | |
|---|---|---|
| 2,230,042 | Kleber et al. | Apr. 22, 1941 |
| 2,270,789 | Smith | Jan. 20, 1942 |
| 2,320,429 | Hasbrouck | June 1, 1943 |
| 2,454,687 | Baughman | Nov. 23, 1948 |
| 2,691,103 | Van Zelst | Oct. 5, 1954 |
| 2,787,750 | Jones | Apr. 2, 1957 |
| 2,787,783 | Storm | Apr. 2, 1957 |
| 2,802,908 | Jordan | Aug. 13, 1957 |
| 2,811,709 | Haselton et al. | Oct. 29, 1957 |